United States Patent

Cipolla et al.

[11] Patent Number: 5,910,883
[45] Date of Patent: Jun. 8, 1999

[54] HINGE INCORPORATING A HELICALLY COILED HEAT PIPE FOR A LAPTOP COMPUTER

[75] Inventors: Thomas Mario Cipolla, Katonah; Paul William Coteus, Yorktown Heights; Lawrence Shungwei Mok, Brewster, all of N.Y.

[73] Assignee: International Business Machines Corporation, Armonk, N.Y.

[21] Appl. No.: 08/907,119

[22] Filed: Aug. 6, 1997

[51] Int. Cl.⁶ .................................. G06F 1/20; H05K 7/20
[52] U.S. Cl. .......................... 361/687; 165/86; 165/104.33
[58] Field of Search ..................... 361/687–689, 361/700, 704; 364/708.1; 165/86, 104.33; G06F 1/16

[56] References Cited

U.S. PATENT DOCUMENTS

| | | |
|---|---|---|
| 4,104,700 | 8/1978 | Hutchison et al. . |
| 5,129,448 | 7/1992 | Holmberg, Jr. et al. . |
| 5,331,510 | 7/1994 | Ouchi et al. . |
| 5,339,214 | 8/1994 | Nelson . |
| 5,513,070 | 4/1996 | Xie et al. . |
| 5,621,613 | 4/1997 | Haley et al. . |
| 5,732,765 | 3/1998 | Drolen et al. .............................. 165/86 |

FOREIGN PATENT DOCUMENTS

272263-A  3/1996  Taiwan .

OTHER PUBLICATIONS

Albert Yu, "The Future of Microprocessors", *IEEE Micro*, Dec. 1996, pp. 46–53.

*Primary Examiner*—Lynn D. Feild
*Attorney, Agent, or Firm*—Scully, Scott, Murphy & Presser; Daniel P. Morris

[57] ABSTRACT

An arrangement and method for enhancing the cooling capacity of portable personal computers. The power dissipation of portable personal computers (PCs) is increased by conducting heat through a heat pipe arranged in a hinge structure interconnecting a display panel with a bottom keyboard housing, and conducting the heat into an area at the rear of the display panel.

18 Claims, 4 Drawing Sheets

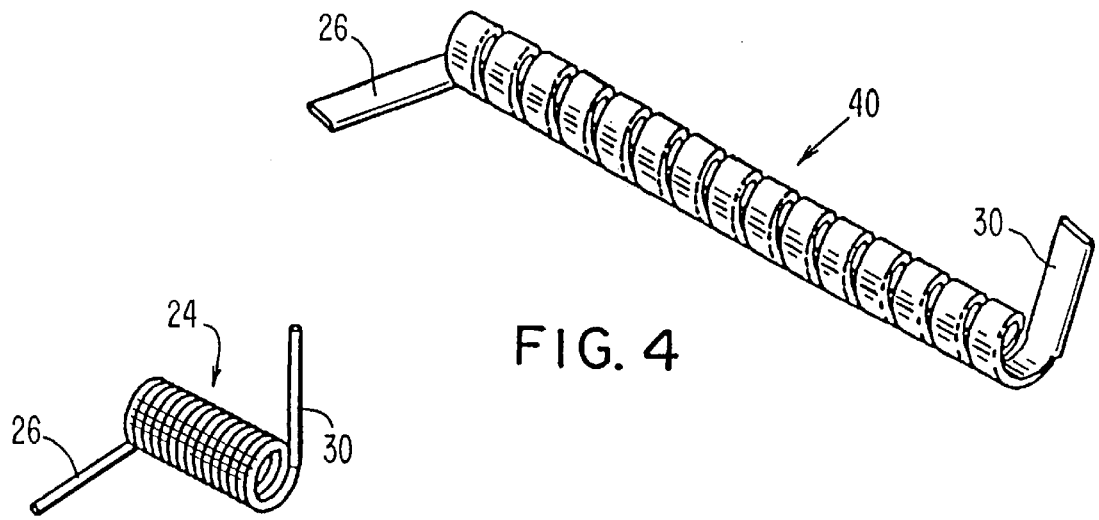
FIG. 4
FIG. 3
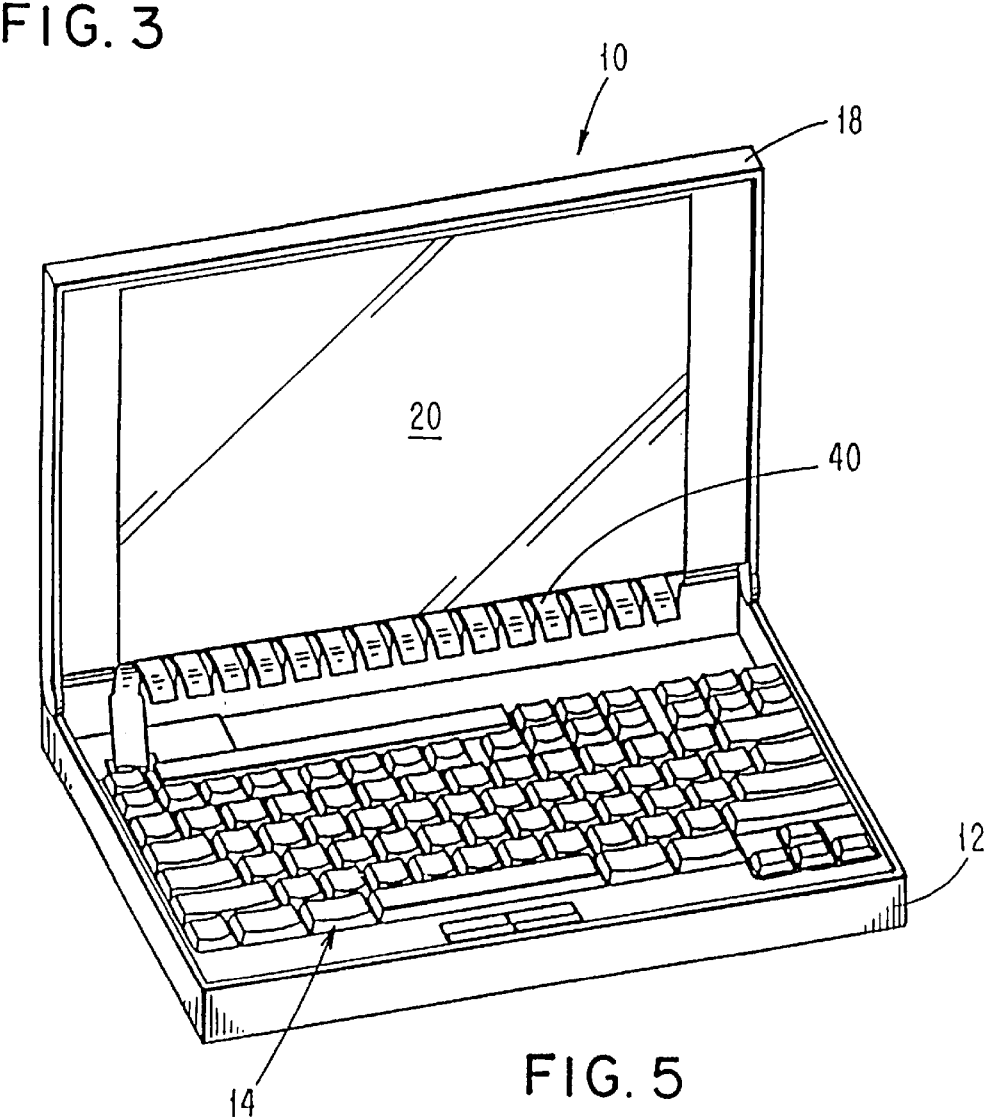
FIG. 5

HINGE INCORPORATING A HELICALLY COILED HEAT PIPE FOR A LAPTOP COMPUTER

BACKGROUND OF THE INVENTION

The present invention relates to an arrangement for enhancing the cooling capacity of portable personal computers. More particularly, the invention is directed to the aspect of enhancing the power dissipation of portable personal computers (PCS) by conducting heat through a heat pipe arranged in a hinge structure interconnecting a display panel with a bottom keyboard housing, and conducting the heat into an area at the rear of the display panel.

The capacity and performance of portable personal computers, such as laptop computers, notebook computers or the like, has recently been enhanced to such an extent that; for example, since the beginning of 1996, the thermal dissipation requirements of portable personal computers (PCs) have increased from about 10 watts to 20 watts and even higher values. This increase in the thermal dissipation requirements is a result of ever increasing CPU performance and additional functionality; such as DVD, modem, audio and the like, which are provided by future PCs. As eludicated in an article by Albert Yu, "The Future of Microprocessors", IEEE Micro, December 1996, pages 46 through 53, the trend of increasing power dissipation in the form of heat for portable personal computers will continue in the foreseeable future. Thus, at the widely employed A4 form factor for a portable personal computer; for instance, the cooling limit for a portable PC without a cooling fan is currently approximately 15 to 20 watts. Thus, providing a greater cooling capacity than the current limits in order to meet the anticipated thermal dissipation requirements of future portable personal computers, represents not only a potential competitive advantage in industry, but also provides a significant product differentiation from currently available and commercially sold portable personal computers.

In order to meet the requirements for enhancing the cooling capacities of portable personal computers, pursuant to the invention, a personal computer, especially such as a laptop computer having an openable display panel and a keyboard articulated to the bottom thereof, incorporates a heat pipe for conducting heat through the hinge of the display panel which connects the latter to the keyboard, and which essentially dumps the heat in an area towards the rear of the display. At that location, the availability of an increased surface area and the presence therein of relatively few electronics facilitates an increased degree of heat dissipation into the ambient air or surroundings.

In addition to the foregoing function, the arrangement of employing the heat pipe as a component of the hinge structure of the laptop computer enables current carrying conductors to extend therethrough to form a flexible Faraday cage around the conductors for electromagnetic interference (EMI) protection of the conductors which are attached to the body or housing of the computer at one end and to the display at the other end.

An extremely valuable area for dissipating heat on a laptop computer is the back of the display. This area is normally not used effectively because very few heat generating components are located in this area. Furthermore, it is difficult to conduct more heat to this area from the lower portion or keyboard of the laptop computer because the means to implement this has to pass through a hinge forming the interconnection between the lower portion of the laptop computer and the display panel. Additionally, it is difficult to locate heat generating components, such as the CPU, in this area because the large number of signal wires which must pass through the hinge in order to communicate with the other components located in the lower portion of the laptop computer.

A well known device for conducting heat efficiently is a heat pipe. The heat pipe normally consists of a length of tubing, usually comprising copper, which is hermetically sealed with a fluid contained therein under a critical pressure such that, when one end of the pipe is in contact with a warm body, the heat from the warm body causes the fluid to boil. The normally vaporous fluid travels to the colder end of the tube and condenses thus taking energy therewith to the other end of the tube. Conductivities of greater than 100 times that of copper can be achieved in this manner. Moreover, the length of the tube has little impact on the conductivity of the heat pipe.

DISCUSSION OF THE PRIOR ART

Various publications disclose the use of heat pipes for the purpose of dissipating power or to provide cooling capacities for computers, for example, such as personal computers of the laptop configuration.

Haley et al. U.S. Pat. No. 5,621,613 discloses a laptop computer wherein a heat pipe structure connects with a device contained in a keyboard housing for dissipating heat.

Xie et al. U.S. Pat. No. 5,513,070 discloses a heat pipe arranged in a keyboard housing of a laptop computer for dissipating heat, wherein a heat flow is directed towards the back of the housing.

Nelson U.S. Pat. No. 5,339,214 discloses a finned heat pipe connected to the housing of a computer chassis so as to direct heat towards the rear of the chassis.

Ouchi et al. U.S. Pat. No. 5,331,510 discloses a heat pipe arranged in a computer housing structure for directing heat away from electronic components contained in the housing structure.

Holmberg, Jr. et al. U.S. Pat. No. 5,129,448 discloses a hinged heat transfer joint which includes plate elements adapted to dissipate heat from electronic components arranged within a computer housing.

Hutchinson et al. U.S. Pat. No. 4,104,700 discloses a heat pipe cooling system and device for conveying heat towards the rear of a printed circuit board containing electronic components.

Finally, Taiwanese Patent Publication TW272263-A to Hasegawa et al. discloses a cooling device for portable personal computers, wherein a heat pipe has one end connected to electronic elements and another end connected to extend along the hinge structure of a computer, such as a laptop computer.

Although all of the foregoing publications disclose the use of heat pipes or similar structures for conducting and dumping heat generated during the use of the computer towards the back of a display or housing structure, these still fail to provide the necessary cooling capacity required for the new generation of personal computers in which the thermal dissipation requirements have been and are being drastically increased.

Inasmuch as the heat pipe is generally a solid hermetically sealed unit, it does not readily lend itself to mechanical motion of one end while the other end remains fixed, as would be the instance if a heat pipe were to be passed directly through the hinge of a laptop computer.

SUMMARY OF THE INVENTION

Accordingly, pursuant to the present invention there is provided a novel heat pipe arrangement in which the heat pipe is passed directly through the hinge conclusion of a laptop computer interconnecting a keyboard housing with a foldable display panel, and wherein, in the event the heat pipe is coiled in the form of a spring with the axis of the coil extending concentrically with the pivot point of the hinge of the computer structure, the stresses of bending would be distributed over the entire length of the heat pipe. Inasmuch as the length of the pipe does not have any appreciable effect on conductivity, the length of the tube added to distribute the stresses will have only a little or even no detrimental effect on the conduction of heat to the back of the display.

Accordingly, it is an object of the present invention to provide a novel cooling arrangement for portable personal computers, particularly such as laptop computers, which enhances the cooling capacity thereof, and wherein a hinge structure which is present between a lower housing portion containing the keyboard and various electronics and a display housing containing a display panel incorporates a heat pipe for conducting off generated heat.

It is another object of the present invention to provide a heat pipe for dissipating the heat generated in a laptop computer or the like, in which the construction of the heat pipe forms a flexible Faraday cage which is adapted to convey current-carrying conductors from the keyboard region of the computer to the display area, and thereby protect the environment from electromagnetic interference.

BRIEF DESCRIPTION OF THE DRAWINGS

Reference may now be had to the following detailed description of preferred embodiments of the invention, taken in conjunction with the accompanying drawings; in which:

FIG. 3 illustrates a perspective view of a heat pipe which is circular or round in transverse cross section;

FIG. 4 illustrates a heat pipe which, instead of being round in transverse cross-section, has been flattened prior to coiling;

FIG. 5 illustrates a view similar to FIG. 1, modified to show the computer with the heat pipe of FIG. 4 installed therein;

DETAILED DESCRIPTION OF PREFERRED EMBODIMENTS

Figure 1:
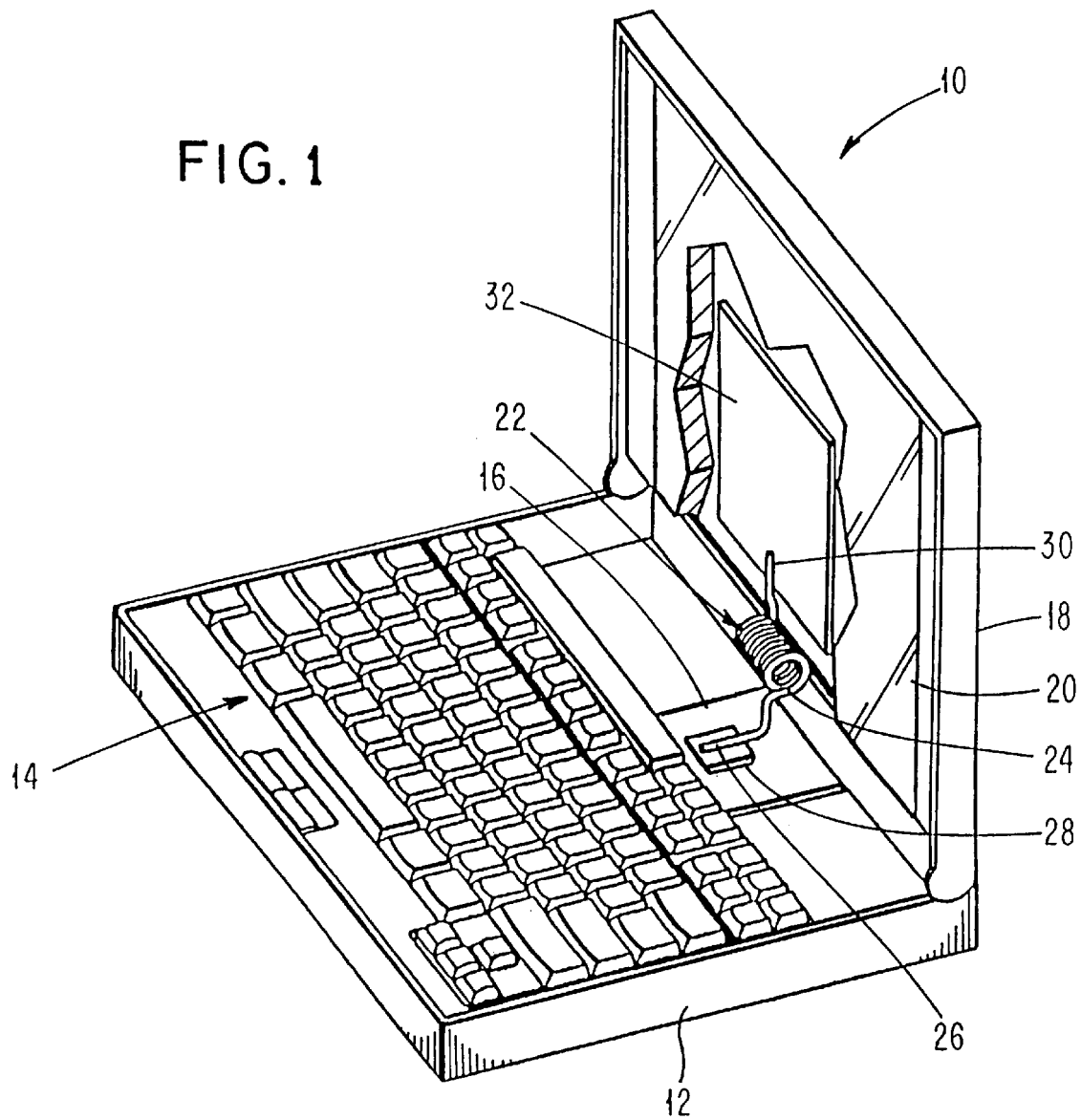
FIG. 1 illustrates a perspective view of a laptop computer indicative of a heat generating component, such as a CPU, being connected to one end of a heat pipe and with the heat pipe being connected at an opposite end thereof to a heat spreader which is arranged behind the display of the laptop computer.
Figure 2A:
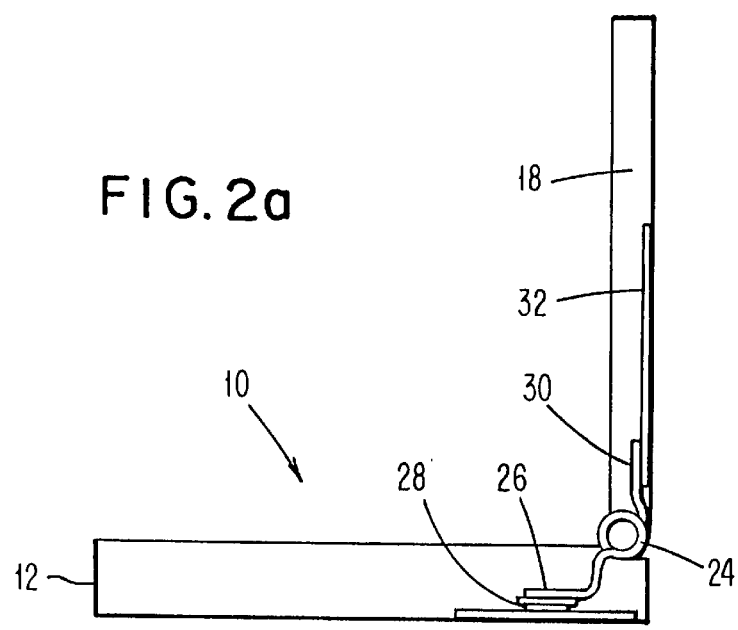
FIGS. 2a, 2b, and 2c illustrate, respectively, side sectional views of the laptop computer of FIG. 1 showing the heat-generating component, the heat pipe and the heat spreader behind the display, with the respective views as showing the display panel in the 90° opened; closed, and fully opened positions.
Figure 2B:
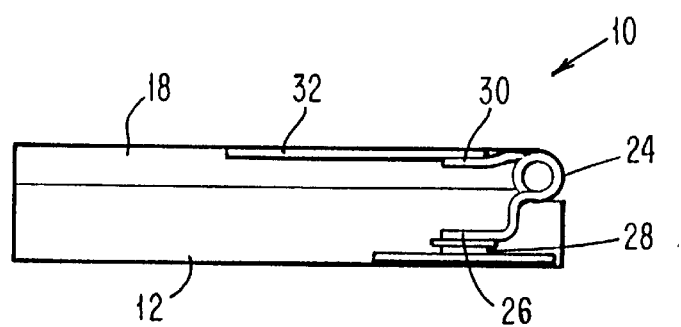
Figure 2C:
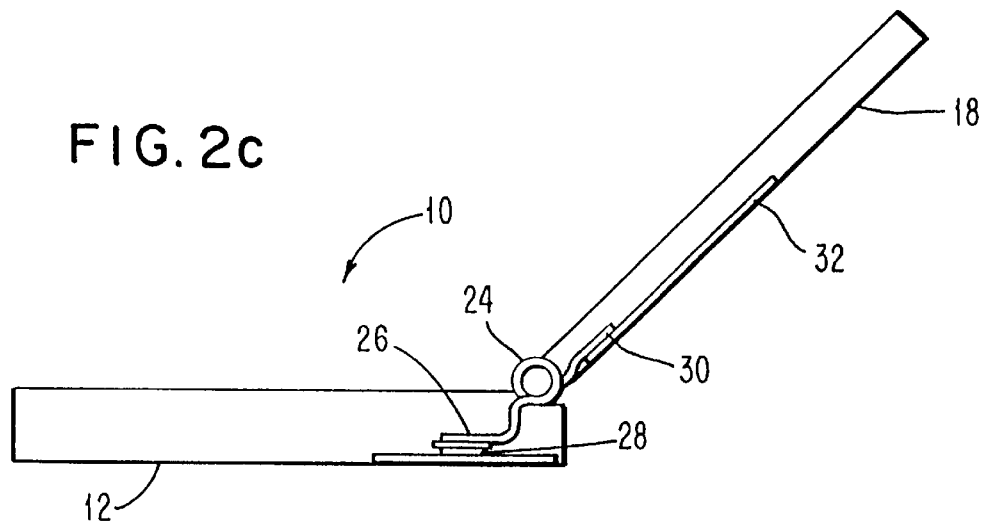

Referring now in more specific detail to the drawings, and particularly FIGS. 1 through 2c, there is illustrated a laptop computer 10 having a lower or bottom housing 12 mounting a keyboard 14, and which also constitutes an area for the containment of electronic components and a CPU 16. A foldable display housing or panel 18 containing a computer display screen 20 is hingedly connected to the housing containing the keyboard. The hinge structure 22 incorporates a heat pipe 24 in the form of a coil which possesses a round or tubular transverse cross-section, which has one end 26 extending therefrom and attached to a heat-generating component 28 located in the keyboard-containing housing 12, such as a CPU, and which is passed through the hinge structure by coiling of the heat pipe, as shown in FIG. 3, and then with the opposite end 30 being attached to a heat spreader 32 located at the back surface or within the back region of the display panel 18, to which the heat is transferred through the heat pipe 24 and then, in turn, dissipated to ambient air or the surroundings through the outer surface of display housing 18.

As shown in the sectional side views of FIGS. 2a through 2c, wherein the display housing or panel 28 is represented in various positions relative to the keyboard housing 12, such as being opened to 90° in FIG. 2a, in the closed position of the laptop computer in FIG. 2b, or fully opened so as to be inclined rearwardly, for example, at an angle of approximately 135° from the plane of keyboard housing as in FIG. 2c, the heat pipe 24 is a coiled element consisting of hollow tubing as shown with a round or circular transverse cross-section in FIG. 3 of the drawings.

The heat pipe 24 can be constituted of stainless steel, beryllium copper or similar suitable materials, having, for example, a 3 mm outside diameter with an 0.3 mm wall thickness, and coiled as shown in FIG. 3 so as to provide a coil having an external diameter of about 22 mm and an inside diameter of about 16 mm. The coil is capable of being flexed in a tangential direction at plus or minus 90° such as would be encountered when installed in a portable computer or laptop computer, and twisted between the closed position as shown in FIG. 2b, and the fully opened position shown in FIG. 2c, in effect subtending a flexural or torsional angle of approximately 135°. The length of the coil material should be such that the stresses of bending at maximum stress levels should not exceed the yield stress of the material. In essence, in the uncoiled condition, a coil length of approximately 1 meter would be in all likelihood satisfactory for extensive use and endurance.

In order for the heat pipe 24 to work effectively there must be available a sufficient cross-sectional area for the evaporant therein to travel to the cold end 30 and the condensate to flow back to the hot end 26 thereof. In applications where the condensate does not flow all the way by gravity, such as encountered in a coiled structure, there must be enough room in the cross-sectional area to provide a wick of sufficient size to carry the condensate back to the hot end 26. For a length of 1 meter, it is generally known that tubing of 3 mm outside diameter is not sufficient. A round tubing of approximately 5 mm outside diameter would be needed. If 5 mm OD tubing were coiled in such a way to be able to tangentially deflect plus or minus 90°, the tubing would have to be approximately two meters long to sufficiently distribute the stresses below the yield point of the material. This size would be too large to fit into a portable personal computer. However, if the tubing were flattened to have a thickness of 3 mm, the stresses would be the same as that of 3 mm OD round tubing, since the stresses only depend on the thickness of the material in the direction of bending. Then the length of tubing in that case is again approximately one meter. 10 mm diameter tubing that has been flattened to 3 mm has approximately the same cross sectional area as round tubing of 5 mm in diameter. When 1 meter of this tubing is coiled to a 22 mm outside diameter the overall length of the heat pipe is approximately 200 mm.

The foregoing flattening of the tube, as shown in FIG. 4, provides as indicated herein, the same cross-sectional area, and is also adequate in providing the transfer or conducting of heat through the heat pipe from the electronics to the heat spreader.

As illustrated in FIG. 5 of the drawing, wherein components which are similar to or identical with those in FIG. 1 are identified by the same reference numerals, in that instance, rather than the heat pipe having a circular cross section as shown in FIG. 3 being installed about the hinge, in this instance the heat pipe 40 is that illustrated in FIG. 4 of the drawings, as showing the flattened transverse cross-sectional area thereof. In all other respects, the function and installation of the heat pipe 40 is similar to that of FIGS. 1 to 3 of the drawings.

Figure 6:
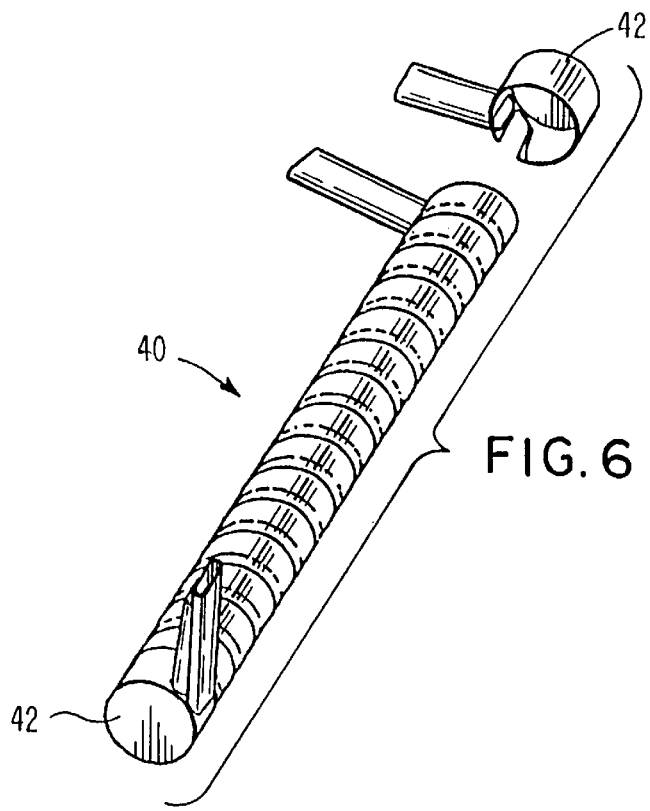
FIG. 6 illustrates the heat pipe of FIG. 4 having end caps mounted thereon to facilitate the passage therethrough of current-carrying conductors which extend along the center of the coil.
Figure 7:
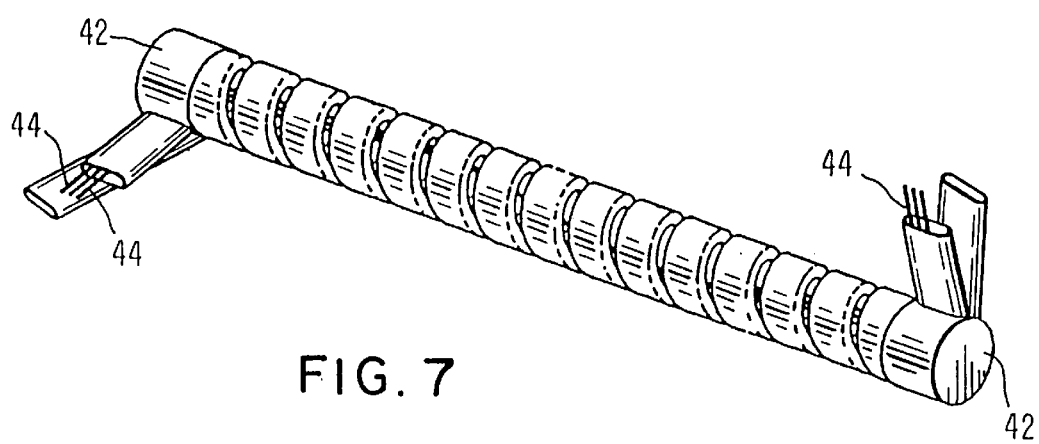
FIG. 7 illustrates a heat pipe similar to that of FIG. 6 but with the current-carrying conductors shown extending therethrough.

Pursuant to a further aspect of the invention, the heat pipe 40 of preferably the configuration of FIG. 4, can be employed as a flexible Faraday cage which can carry current-carrying conductors from the keyboard housing 12 of the computer 10 to the display panel 18, thus protecting the environment from electromagnetic interference (EMI). Conductors extending through a bare coil would normally emit EMI at the inlet and outlet of the coil 40 and, consequently, a conducting cap 42, such as is shown in FIG. 6, would be attached to the end of the coiled heat pipe 40 in order to prevent the foregoing. As shown in FIG. 7 of the drawing, this illustrates the heat pipe 40 of FIG. 6 with the current-carrying conductors 44 arranged therein.

From the foregoing, it becomes readily apparent that the novel heat pipe construction which is arranged as a hinge structure for the laptop computer 10 enhances the power dissipation of portable personal computers through the coiled heat pipe configurations 24,40 so as to transfer heat from hot electronic components in the lower portion or keyboard-containing housing 12 of the computer to a heat spreader 32 arranged at the rear side of the display panel 18. The coiling of the heat pipe 24,40 distributes the stresses of bending the pipe as it is passed through the hinge between the lower housing portion 12 of the computer and the back of the display panel 18, thereby imparting a simple and compact construction to the overall arrangement.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

Having thus described our invention, what we claim as new, and desire to secure by Letters Patent is:

1. An arrangement for dissipating heat generated by at least one electronic component of a portable personal computer having a bottom housing for a keyboard and a display panel hingedly connected to a rear edge of said housing, said at least one electronic component being located in said housing, said heat dissipating arrangement comprising a linear hinge structure extending between said housing and said display panel to facilitate pivotable movement between said housing and said display panel, said linear hinge structure consisting of a helically coiled length of tubing forming a heat pipe having windings wound along an axial length constituting the hinge connection between said housing and said display panel, one end of said helically coiled heat pipe being connected to said at least one heat-generating electronic component and an opposite end of said coiled heat pipe being connected to a heat spreader at a rear surface of said display panel for conducting heat from said electronic components to said heat spreader.

2. An arrangement as claimed in claim 1, wherein the ends of said coiled heat pipe are tangentially deflectable responsive to pivoting movement of said display panel so as to be rotatably movable relative to each other.

3. An arrangement as claimed in claim 1, wherein said heat spreader comprises a plate element mounted in said display panel for dissipating heat to the surroundings.

4. An arrangement as claimed in claim 1, wherein said tubing forming said heat pipe is circular in transverse cross-section having an outer diameter in the range of about 3 mm to 10 mm and a wall thickness of about 0.3 mm, said coils having an outside diameter of about 22 mm, and the tubing for said coiled heat pipe having an uncoiled length of about 1 to 2 meters and a coiled length of about 200 mm.

5. An arrangement as claimed in claim 4, wherein said heat pipe is made from stainless steel or beryllium copper tubing.

6. An arrangement as claimed in claim 4, wherein said tubing forming said heat pipe has an outer diameter of about 10 mm and is flattened to a thickness of about 3 mm.

7. An arrangement as claimed in claim 1, wherein electrical conductors are conveyed through said heat pipe which forms a flexible Faraday cage.

8. An arrangement as claimed in claim 7, wherein conducting caps are mounted at the ends of said heat pipe forming a protective shield preventing the environment from electromagnetic interference.

9. An arrangement as claimed in claim 1, wherein said computer is a laptop computer.

10. A method of dissipating heat generated by at least one electronic component of a portable personal computer having a bottom housing for a keyboard and a display panel hingedly connected to a rear edge of said housing, said at least one electronic component being located in said housing, said method comprising locating a heat pipe constituting a hinge structure extending between said housing and said display panel to facilitate pivotable movement between said housing and said display panel, said linear hinge structure consisting of a helically coiled length of tubing having windings wound along an axial length and consisting of the hinge connection between said housing and said display panel, connecting one end of said coiled heat pipe to said at least one heat-generating electronic component and connecting an opposite end of said coiled heat pipe to a heat spreader at a rear surface of said display panel for conducting heat from said electronic components to said heat spreader.

11. A method as claimed in claim 10, wherein the ends of said coiled heat pipe are tangentially deflectable responsive to pivoting movement of said display panel so as to be rotatably movable relative to each other.

12. A method as claimed in claim 10, wherein said heat spreader comprises mounting a plate element in said display panel for dissipating heat to the surroundings.

13. A method as claimed in claim 10, wherein said tubing forming said heat pipe is circular in transverse cross-section having an outer diameter in the range of about 3 mm to 10 mm and a wall thickness of about 0.3 mm, said coils having an outside diameter of about 22 mm, and the tubing for said coiled heat pipe having an uncoiled length of about 1 to 2 meters and a coiled length of about 200 mm.

14. A method as claimed in claim 13, wherein said heat pipe is made from stainless steel or beryllium copper tubing.

15. A method as claimed in claim 13, wherein said tubing forming said heat pipe has an outer diameter of about 10 mm and is flattened to a thickness of about 3 mm.

16. A method as claimed in claim 10, wherein electrical conductors are conveyed through said heat pipe which forms a flexible Faraday cage.

17. A method as claimed in claim 16, wherein conducting caps are mounted at the ends of said heat pipe forming a protective shield preventing the environment from electromagnetic interference.

18. A method as claimed in claim 10, wherein said computer is a laptop computer.

* * * * *